United States Patent [19]

Dieterich

[11] 4,261,411
[45] Apr. 14, 1981

[54] SUN SHADES FOR MOTOR VEHICLES

[76] Inventor: Richard E. Dieterich, P.O. Box 3323, Beach Station, Vero Beach, Fla. 32960

[21] Appl. No.: 13,738

[22] Filed: Feb. 21, 1979

[51] Int. Cl.³ .......................... A47G 5/02; A47H 1/00
[52] U.S. Cl. .................................. 160/290 R; 160/98; 160/DIG. 3
[58] Field of Search ...................... 160/DIG. 3, 23, 85, 160/237, 290 R, 98; 296/78 R, 83, 84 E, 84 M, 97 R, 97 A, 97 B, 97 C, 97 D, 97 E, 97 F, 97 G, 97 H, 141, 142, 152

[56] References Cited

U.S. PATENT DOCUMENTS

| 545,655 | 9/1895 | Jones | 160/85 |
|---|---|---|---|
| 1,461,478 | 7/1932 | Daniels | 160/290 R |
| 1,589,475 | 6/1926 | Lowther | 296/97 F |
| 2,791,272 | 5/1957 | Stehlik | 160/290 R |
| 2,878,055 | 3/1959 | Werner et al. | 296/152 |

*Primary Examiner*—Peter M. Caun
*Attorney, Agent, or Firm*—Carroll F. Palmer

[57] ABSTRACT

A sun shade for the sloping rear windows of so-called hatchback cars or similar motor vehicle windows comprises a sheet of flexible opaque material that extends over the inside surface of the window. The sheet has parallel rows of elongated slots therein that run from the lower edge of the window up to the upper edge. A clear view of the rear outside can be had by a person in the vehicle through the sun shade and the rear window, but the vehicle interior is effectively shielded from the heat of the sun by the sun shade.

4 Claims, 4 Drawing Figures

SUN SHADES FOR MOTOR VEHICLES

BACKGROUND OF THE INVENTION

1. Field of the Invention

This invention relates to sun shades for motor vehicles and, more particularly, such shades that can be effectively used with motor vehicles that have severely sloping rear windows, such as the so-called hatchback cars.

2. Description of the Prior Art

It is, of course, well known to use window shades to screen the interiors of buildings and other structures from the sun. Sun shades of various types have also been devised for use with motor vehicles, e.g., see U.S. Pat. No. 3,025,098. Some window shields for vehicles have been constructed so that they can be rolled up around a spindle in a casing for storage when not in use, e.g., see U.S. Pat. No. 3,183,033.

It is also known to form light screens for vehicles from sheet material perforated with numerous holes so that only a limited amount of the light radiated on the screens will pass through to the eyes of a viewer, e.g., see U.S. Pat. No. 1,589,475; 1,928,249 and 1,990,222.

Several of the above noted features have been utilized in providing perforated sun visors for motor vehicles, see U.S. Pat. No. 3,445,135. Such sun visors, which comprise a multiplicity of small round holes arranged in a uniform pattern, are satisfactory for use on substantially vertical windows, but when used with highly sloping or slanted windows, such as the rear windows of hatchback cars, sport cars, etc., they do not permit objects on the outside of the vehicle to be satisfactorily viewed from within the vehicle through the sloped sun visor.

OBJECTS

A principal object of the invention is the provision of new, improved forms of sun shades for motor vehicles.

Another object is the provision of aperatured sun shades that can effectively shield the inside of a motor vehicle from the heat of the sun falling on a highly sloping rear window, e.g., a window angled at 20° to 70° of horizontal, while permitting a person within the vehicle to obtain a clear view of objects outside the vehicle through the sun shade.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished in accordance with the invention by forming sun shades for motor vehicles of the flexible sheet, roll-up type with a plurality of slots in the flexible sheet through which light may pass, such slots being elongated thereby having a major longitudinal axis and a minor transverse axis and arranged in a series of parallel rows that are oriented in substantially vertical planes with all the slots in any row having their major longitudinal axes aligned. The longitudinal axis of the slots are at least five times the length of their transverse axis and, preferably, the length of the longitudinal axis is between 5 to 15 times the length of the transverse axis.

BRIEF DESCRIPTION OF THE DRAWINGS

A more complete understanding of the new sun shades of the invention may be had by reference to the accompanying drawings in which.

DESCRIPTION OF THE PREFERRED EMBODIMENTS

Figure 1:
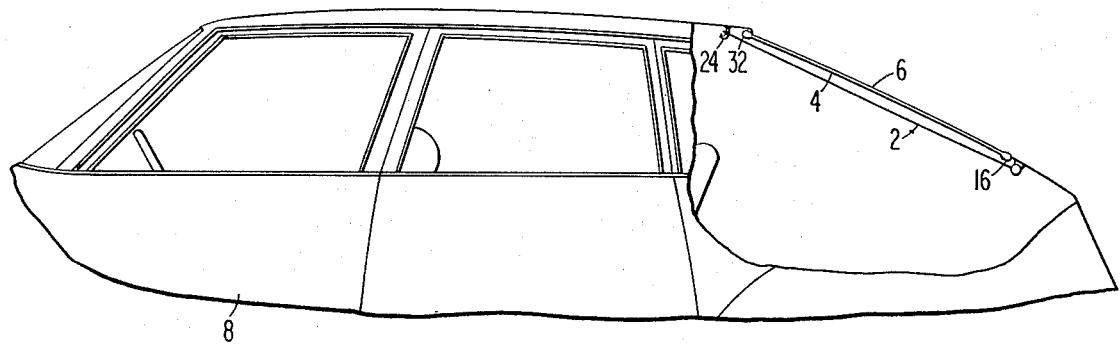
FIG. 1 is a fragmentary side elevational view, partially broken away, of an automobile equipped with a rear window sun shade of the invention.

Referring in detail to the drawings, the sun shade 2 extends over the inside surface 4 of the rear window 6 of the hatchback style automobile 8.

The shade 2 comprises a sheet of flexible material 10 that rolls onto a spring biased roller or spindle 12 that revolves in the cylinderical housing 14. The housing 14 may be mounted adjacent one of the horizontal edges of the window 6, e.g., the lower inside edge 16, by means of the brackets 18. By unrolling the sheet 10 from the housing 14, the shade 2 may be extended over the inside surface 4 of the window 6 and held in such extended position by means of aperatured tabs 20 fixed to the free end 22 of sheet 10 and hooks 24, fastened to the vehicle 8, over which the tabs 20 are hooked.

A plurality of elongated slots 26 are formed in the sheet 10 through which light may pass. The slots have a major longitudinal axis "1" and a minor transverse axis "w". The axis "1" is at least 5 times the length of the axis "w" and, preferably "1" is 5 to 15 times the length of "w".

Figure 3:
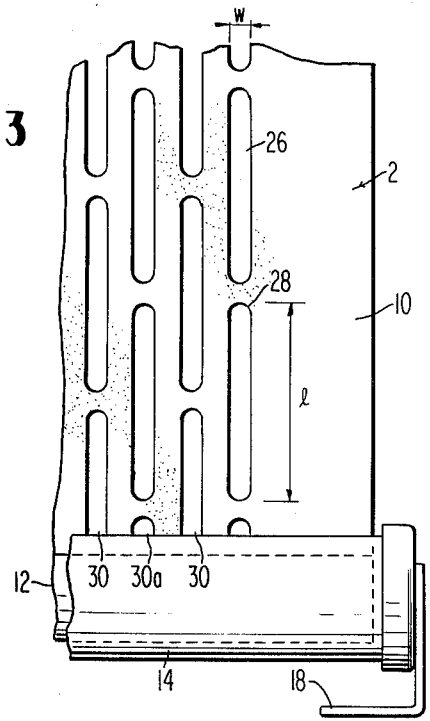
FIG. 3 is a fragmentary, enlarged plan view of a corner portion of the sun shade of FIG. 2.

The ends 28 of slots 26 may be rounded as shown in FIG. 3 or they may be squared-off or pointed.

Figure 2:
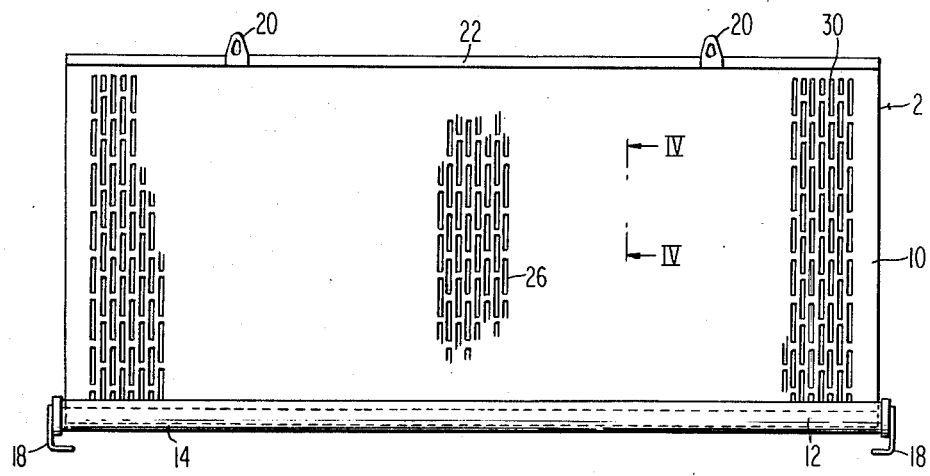
FIG. 2 is a plan view of a sun shade of the invention.

The slots 26 are arranged in a series of parallel rows 30 that are oriented perpendicularly to the spindle 12 so that the rows 30 run between the horizontal edges 16 and 32 of window 6. As seen in FIGS. 2 and 3, all the longitudinal axes "1" of slots 26 in any row 30 are aligned with one another perpendicularly to the spindle 12. The slots 26 in alternate rows are preferably staggered relative to the slots 26 of adjacent rows 30a. The degree of staggering can be varied to give a variety of slot patterns. Advantageously, the spacing between the rows 30 and 30a are about the same width as the axis "w". Preferably, the length of axis "w" is between about 1 to 3 mm. and and the length of axis "1" is between about 5 to 45 mm., specially 10 to 20 mm.

Figure 4:
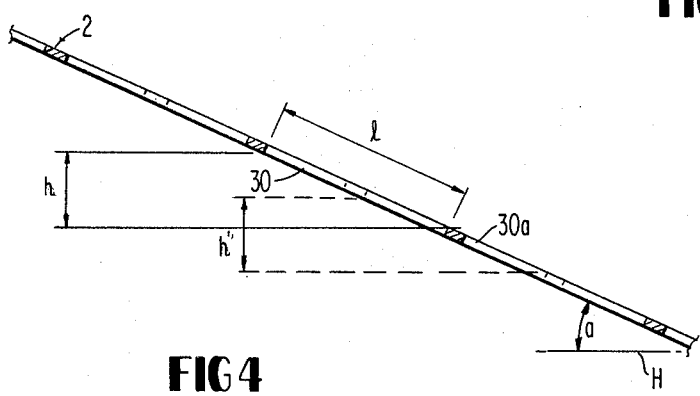
FIG. 4 is a fragmentary, side sectional taken on the line IV—IV of FIG. 2.

With reference to FIG. 4, when installed in a sloped rear window 6 of the vehicle 8, the shade 2 may assume an angle "a" between about 20° to 70° of the horizontal "H". When a person within the interior of the vehicle 8 looks through the rear window 6 and sun shade 2, the height "h" of a slot 30 will appear to be much less to the viewer than the length "1" of the slot. This same is true of the apparent height "h" of the adjacent slot 30a. However, the apparent openings "h", "h¹" etc., are sufficiently large to give the viewer within the vehicle 8 a clear view of objects outside and to the rear of the vehicle 8. At the same time, rays of the sun falling on the window 6 will be sufficiently screened by the shade 2 so that the interior of the vehicle 8 will be significantly protected against the sun's heat. By way of example, the temperature behind a window 6 of a vehicle 8 exposed to direct rays of the sun in the absence of the shade 2 can be 120° F., but with the shade 2 extended across the window 6, the temperature will be only about 80° F.

While the new sun shades are designed primarily for use with sloped rear windows of motor vehicles, they may be effectively used with any of the other windows in such vehicles as well as in airplanes, boats, recreational vehicles, vans, etc. Also, other types of brackets, retaining means etc. other than those specifically shown and described can be used in fabrication of the new sun shades.

The embodiments of the invention in which an exclusive property or privilege is claimed are defined as follows:

1. In a sun shade for a sloping rear window of a motor vehicle which comprises a substantially rectangular sheet of flexible opaque material that unrolls from a spring biased spindle that revolves in a housing mounted adjacent one horizontal edge of the window and be held in such window covering position by retaining means located adjacent the other horizontal edge of the window, the improvement that comprises a plurality of slots in said flexible sheet through which light may pass, said slots being elongated thereby having a major longitudinal axis and a minor transverse axis, the longitudinal axis being at least five times the length of said transverse axis, said slots being arranged in a series of parallel rows that are oriented perpendicularly to said spindle to thereby run between said horizontal edges of said window, all longitudinal axes of the slots in any row being aligned with one another perpendicularly to said spindle.

2. The sun shade of claim 1 wherein the slots in alternate rows are staggered relative to the slots in adjacent rows.

3. The sun shade of claim 1 wherein said one horizontal edge is the lower edge of said window and said other horizontal edge is the upper edge of said window.

4. The sun shade of claim 1 wherein said retaining means comprises aperatured tabs fixed to the end of said rectangular sheet that extends to said other horizontal edge and hooks fastened to said motor vehicle over which said tabs may be hooked.

* * * * *